US009831693B2

(12) United States Patent
Tan et al.

(10) Patent No.: US 9,831,693 B2
(45) Date of Patent: Nov. 28, 2017

(54) TECHNIQUES FOR SERIAL INTERFACE CHARGING

(71) Applicant: Intel Corporation, Santa Clara, CA (US)

(72) Inventors: Siang Yeong Tan, Tanjun Bunga (MY); Wee Hoe, Bayan Lepas (MY)

(73) Assignee: INTEL CORPORATION, Santa Clara, CA (US)

( * ) Notice: Subject to any disclaimer, the term of this patent is extended or adjusted under 35 U.S.C. 154(b) by 609 days.

(21) Appl. No.: 14/129,537

(22) PCT Filed: Nov. 28, 2012

(86) PCT No.: PCT/US2012/066725
§ 371 (c)(1),
(2) Date: Dec. 26, 2013

(87) PCT Pub. No.: WO2013/085761
PCT Pub. Date: Jun. 13, 2013

(65) Prior Publication Data
US 2014/0132216 A1 May 15, 2014

(30) Foreign Application Priority Data

Dec. 6, 2011 (MY) .............................. PI 201105914

(51) Int. Cl.
*H02J 7/00* (2006.01)
*G06F 1/26* (2006.01)
(Continued)

(52) U.S. Cl.
CPC ............ *H02J 7/0044* (2013.01); *G06F 1/263* (2013.01); *G06F 1/266* (2013.01); *H01M 10/425* (2013.01); *H01M 10/44* (2013.01); *H02J 7/007* (2013.01)

(58) Field of Classification Search
USPC ........................................................ 320/114
See application file for complete search history.

(56) References Cited

U.S. PATENT DOCUMENTS 6,492,792 B1 12/2002 Johnson, Jr. et al.
6,936,936 B2 8/2005 Fischer et al.
(Continued)

FOREIGN PATENT DOCUMENTS

| EP | 1037358 | 9/2000 |
|---|---|---|
| KR | 10-1036085 B1 | 5/2011 |
| WO | 2011130026 | 10/2011 |

OTHER PUBLICATIONS

International Search Report and Written Opinion, Mailed Date: Feb. 25, 2013, Application No. PCT/US2012/066725 Filed Date: Nov. 28, 2012, pp. 13.

(Continued)

*Primary Examiner* — Robert Grant

(57) ABSTRACT

Techniques for serial interface charging are described. An apparatus may comprise, for example, a serial interface such as a thunderbolt interface and a charger control circuit coupled to the serial interface, the charger control circuit arranged to operate in a charging mode or an on-the-go (OTG) mode based on information received from the serial interface. Another apparatus may comprise, for example, a serial interface such as a thunderbolt interface and a charger circuit coupled to the serial interface, the charger circuit arranged to operate in a first charging mode or a second charging mode based on information received from the serial interface, the information comprising characteristics of a device coupled to the serial interface. Other embodiments are described and claimed.

16 Claims, 7 Drawing Sheets

(51) Int. Cl.
*H01M 10/44* (2006.01)
*H01M 10/42* (2006.01)

(56) References Cited

U.S. PATENT DOCUMENTS

| | | | |
|---|---|---|---|
| 7,039,150 | B1 | 5/2006 | Drori |
| 8,237,414 | B1* | 8/2012 | Li .................. H02J 7/0003 320/103 |
| 8,686,690 | B2 | 4/2014 | Hong |
| 2004/0064621 | A1 | 4/2004 | Dougherty et al. |
| 2009/0079161 | A1* | 3/2009 | Muchow ............. F03D 1/001 320/101 |
| 2009/0124125 | A1* | 5/2009 | Chatterjee ............ H01R 27/00 439/607.05 |
| 2010/0169534 | A1 | 7/2010 | Saarinen et al. |
| 2010/0197367 | A1 | 8/2010 | Pattenden et al. |
| 2011/0055407 | A1 | 3/2011 | Lydon et al. |
| 2012/0284434 | A1* | 11/2012 | Warren ............... H04L 47/2441 710/22 |
| 2012/0286741 | A1* | 11/2012 | Seethaler ............ H02J 7/0055 320/137 |

OTHER PUBLICATIONS

Search Report and Office Action received for Taiwanese Patent Application No. 101144473, mailed Mar. 30, 2016, 13 pages including 2 pages English translation.
Search Report and Office Action received for Taiwanese Patent Application No. 101144473, mailed Dec. 7, 2016, 7 pages.
"Thunderbolt (code-named Light Peak): an overview", <http://www.2ality.com/2011/02/thunderbolt-code-named-light-peak.html>, Feb. 25, 2011, 3 pages (author unknown).
Extended European Search Report received for European Patent Application No. 12856157.8, dated Jul. 10, 2015, 19 pages.

* cited by examiner

TECHNIQUES FOR SERIAL INTERFACE CHARGING

BACKGROUND

Modern computing systems and mobile devices may provide various processing and computing capabilities. For example, mobile devices may provide users with Internet browsing, word processing, spreadsheets, synchronization of information (e.g., e-mail) with a desktop computer, and so forth. A typical mobile device includes a battery that delivers power to components within the mobile device. Also, the battery may provide power to devices attached to the mobile device. Connections with the devices attached to the mobile device may be provided through various interfaces. Such interfaces may provide media (e.g., conductive lines, wireless channels, etc.) for the transfer of information. Thunderbolt™ technology may be used to implement one example of such an interface. These interfaces, however, may be limited with respect to their power delivery capabilities.

Often, size and cost reductions are important design goals for devices. Accordingly, it may be desirable to reduce the cost and size of components that exchange information and power between attached devices and energy storage components. As a result, it may be desirable to adapt interfaces in a mobile computing device to accommodate information and power to reduce the need for multiple, separate interface components. Consequently, there exists a substantial need for techniques for serial interface charging.

DETAILED DESCRIPTION

Figure 1A:
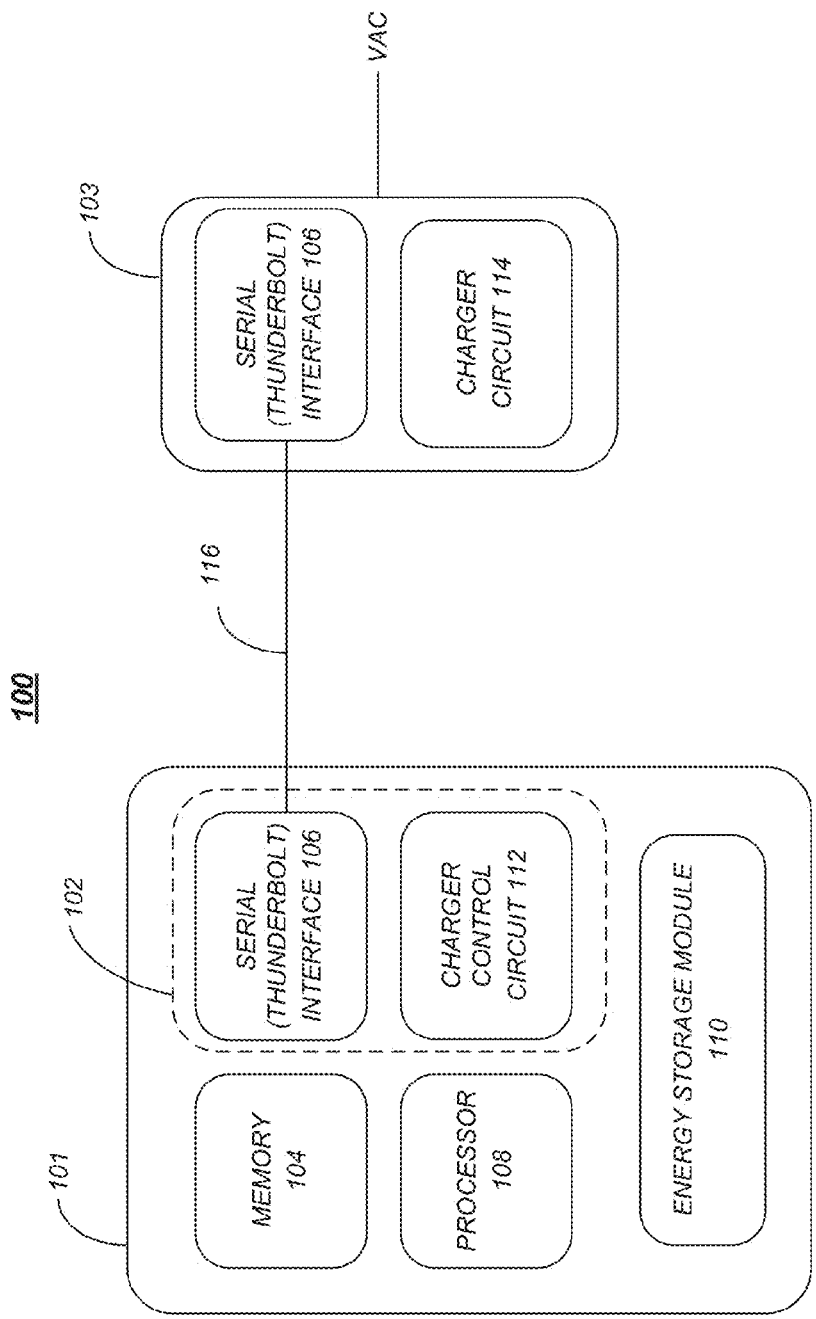
FIG. 1A illustrates one embodiment of a first system.

The embodiments are generally directed to techniques designed to allow for serial interface charging. Various embodiments provide techniques that include a serial interface and a charger control circuit coupled to the serial interface. In some embodiments, the charger control circuit may be arranged to operate in a charging mode or a usage mode, such as an on-the-go (OTG) mode, based on information received from the serial interface. In various embodiments, the serial interface may comprise an interface implementing Thunderbolt™ technology. Other embodiments are described and claimed.

Modern computing systems, particularly mobile computing devices, continue to evolve. One particular area of evolution for these devices is form factor design. Mobile devices continue to decrease in size while the functionality of these devices continues to increase. Many modern computing devices include a number of ports or interfaces that allow for the exchange of information and/or power with external devices that may be communicatively coupled to the mobile device. Examples of these types of devices include, but are not limited to, alternating current (AC) power supplies, universal series bus (USB) devices including those implemented using the USB version 2.0 released in April 2000, its progeny and variants, and devices implementing Thunderbolt™ technology.

Each interface in a mobile computing device requires hardware that occupies space within an enclosure of the device, adds cost to the bill of materials (BOM) for the device and limits the size of the device. With the progression over time toward the use of smaller devices and form factors, a need to reduce the number of interfaces for a device has arisen. Many computing devices include a minimum of two interfaces: one for input/output (I/O) operations and one for power or charging. Some devices may utilize a USB or another similar interface for both I/O operations and for charging, however, these interfaces may be insufficient to handle the demands of increasingly powerful mobile computing devices.

In various embodiments Thunderbolt™ enabled technology, devices, adapters, cables, connectors and other products may comprise or allow for the implementation of a serial interface for connecting and transferring data between devices, such as peripheral devices and computing devices. In some embodiments, Thunderbolt™ technology enabled devices may be arranged to deliver data at up to 10 Gbps, providing great responsiveness with data and display transfers in each direction, at the same time, using a single cable to connect, if desired, multiple devices in a daisy chain or serial configuration. In some embodiments, a Thunderbolt™ technology enabled interface may utilize a small form factor plug, such as a mini-DisplayPort (mDP) adapter to further reduce the size of the components associated with the interface.

In various embodiments, Thunderbolt™ technology may include dual-protocol support (e.g. a PCI Express protocol implemented in accordance with PCI Express Version 3.0 released in November 2010 it's progeny and variants and a DisplayPort protocol implemented in accordance with DisplayPort Version 1.2 released in December 2009 its progeny and variants) and may be compatible with existing DisplayPort devices. Thunderbolt™ technology may enable the daisy chaining of devices in some embodiments and may allow for the choice of electrical or optical cables for use with a Thunderbolt™ technology enabled interface. Despite all of these advances and capabilities of the Thunderbolt™ technology enabled interface, there exists no efficient means today to utilize the Thunderbolt™ technology enabled interface for both data and power. Consequently, various embodiments described herein provide for techniques to enable serial interface charging. For purposes of illustration and not limitation, the embodiments described herein may refer to a serial interface and a Thunderbolt™ technology enabled interface interchangeably. It should be understood, in various embodiments, that a Thunderbolt™ technology enabled interface comprises one form of a serial interface.

Embodiments may include one or more elements. An element may comprise any structure arranged to perform certain operations. Each element may be implemented as hardware, software, or any combination thereof, as desired for a given set of design parameters or performance constraints. Although embodiments may be described with particular elements in certain arrangements by way of example, embodiments may include other combinations of elements in alternate arrangements.

It is worthy to note that any reference to "one embodiment" or "an embodiment" means that a particular feature, structure, or characteristic described in connection with the embodiment is included in at least one embodiment. The appearances of the phrases "in one embodiment" and "in an embodiment" in various places in the specification are not necessarily all referring to the same embodiment.

FIG. 1A illustrates one embodiment of a system. FIG. 1A illustrates a block diagram of a system 100. System 100 may comprise a computing system in some embodiments. As shown in FIG. 1A, system 100 comprises multiple elements, such as apparatus 101, apparatus 103 and cable or connection 116. In various embodiments, apparatus 101 may comprise a mobile computing device and may include memory 104, serial interface 106, processor 108, energy storage module 110 and charger control circuit 112. In some embodiments, apparatus 103 may comprise a charger and may include serial interface 106 and charger circuit 114. In various embodiments, the serial interface 106 may comprise a Thunderbolt™ technology enabled interface and the cable or connection 116 may comprise a Thunderbolt™ technology enabled cable. The embodiments, however, are not limited to the elements or the configuration shown in this figure.

Connection or cable 116 may comprise a Thunderbolt™ technology enabled or other serial cable in some embodiments. In various embodiments, a Thunderbolt™ technology enabled cable may couple with Thunderbolt™ technology enabled or serial interfaces 106 to enable the transmitting and receiving of information for both PCI Express (PCIe) and DisplayPort protocols over a single cable 116. Thunderbolt™ technology enabled cable 116 may comprise a dual mode or dual function serial cable in various embodiments. In some embodiments, Thunderbolt™ technology enabled cable 116 may be fitted with Thunderbolt™ technology enabled connector or adapter or mDP connector or adapter on one or more ends of the cable 116. Other embodiments are described and claimed.

In various embodiments, processor 108 may comprise a central processing unit comprising one or more processor cores. The processor 108 may include any type of processing unit, such as, for example, CPU, multi-processing unit, a reduced instruction set computer (RISC), a processor that have a pipeline, a complex instruction set computer (CISC), digital signal processor (DSP), and so forth.

In various embodiments, memory 104 may comprise any suitable type of memory unit, memory device, memory article, memory medium, storage device, storage article, storage medium and/or storage unit, for example, memory, removable or non-removable media, volatile or non-volatile memory or media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like.

In some embodiments, memory 104 may be arranged to store an operating system (OS) (not shown) that may comprise an interface between various hardware components of apparatus 101 and a user in some embodiments. In various embodiments, the OS may be responsible for the management and coordination of activities and the sharing of the resources of the apparatus 101. In some embodiments, the OS may act as a host for a variety of computing applications run on apparatus 101. For example, the OS may comprise one of Microsoft® Windows®, Apple® OS X®, Linux, iOS®, Android® or any other suitable OS in some embodiments. Other embodiments are described and claimed.

Energy storage module 110 may comprise a battery or other storage medium that is arranged to store energy that may provide operational power to components within apparatus 101, as well as to attached devices (e.g., devices connected through Thunderbolt™ technology enabled interface 106). Accordingly, energy storage module 110 may comprise one or more batteries and/or cells implemented according to various storage technologies. Such technologies may be rechargeable. For example, energy storage module 110 may comprise a rechargeable lithium ion (Li-ion) battery or any other suitable technology. Examples of such technologies include lead and sulfuric acid, nickel cadmium (NiCd), nickel metal hydride (NiMH), lithium ion polymer (Li-ion polymer), and so forth. The embodiments are not limited in this context.

Apparatus 101 may comprise or may be included in a mobile device, such as a laptop computer, desktop computer, netbook computer, tablet computer, smartphone, PDA, or a mobile interface device (MID), in some embodiments. The embodiments, however, are not limited to these examples. In various embodiments, apparatus 101 may receive power from apparatus 103 that may comprise a charger in some embodiments. For example, apparatus 103 may comprise a Thunderbolt™ technology enabled charger that may be coupled to an alternating current (VAC) source of power and may be arranged to adapt VAC to provide power to apparatus 101. In some embodiments, charger 103 may be arranged to charge battery 110 via Thunderbolt™ technology enabled interfaces 106 and Thunderbolt™ technology enabled cable 116. Other embodiments are described and claimed.

In some embodiments, mobile device 101 and charger 103 may each include a Thunderbolt™ technology enabled interface 106. Thunderbolt™ technology enabled interface 106 may comprise a dual mode serial interface and may be arranged to provide for the exchange of information between coupled devices. In various embodiments, Thunderbolt™ technology enabled interface 106 may be adapted to provide for the flow of power. This flow of power may be to or from such attached devices. Exemplary attached devices may include displays, printers, modems, storage devices and various peripheral devices. In addition, such attached devices may include power adapter 103 that provides power (e.g., power at a DC voltage) to apparatus 101. However, other types of attached devices may be employed.

In embodiments, Thunderbolt™ technology enabled interface 106 may provide for connections with such attached devices using Thunderbolt™ technology enabled cable 116. Thunderbolt™ technology enabled cable 116 may couple or link with devices 101 and 103 using Thunderbolt™ technology enabled or mDP adapters or connectors that may form part of Thunderbolt™ technology enabled or mDP interface 106 at each device. For example, devices 101 and 103 may each include a female Thunderbolt™ technology enabled or mDP adapter to receive a male Thunderbolt™ technology enabled or mDP adapter found at either end of Thunderbolt™ technology enabled cable 116. The embodiments are not limited in this context. Although a Thunderbolt™ technology enabled or mDP interface 106 is described herein, embodiments are not limited to employing such an interface.

In various embodiments, apparatus 101 may include charger control circuit 112. Charger control circuit 112 may comprise logic, a module, hardware, software or a combination of hardware and software that is arranged to control charging operations for apparatus 101 in some embodiments. Charger 103 may include charger circuit 114 in various embodiments. Charger circuit 114 may comprise logic, a module, hardware, software or a combination of hardware and software that is arranged to control charger 103 in some embodiments. Other embodiments are described and claimed.

Figure 1B:
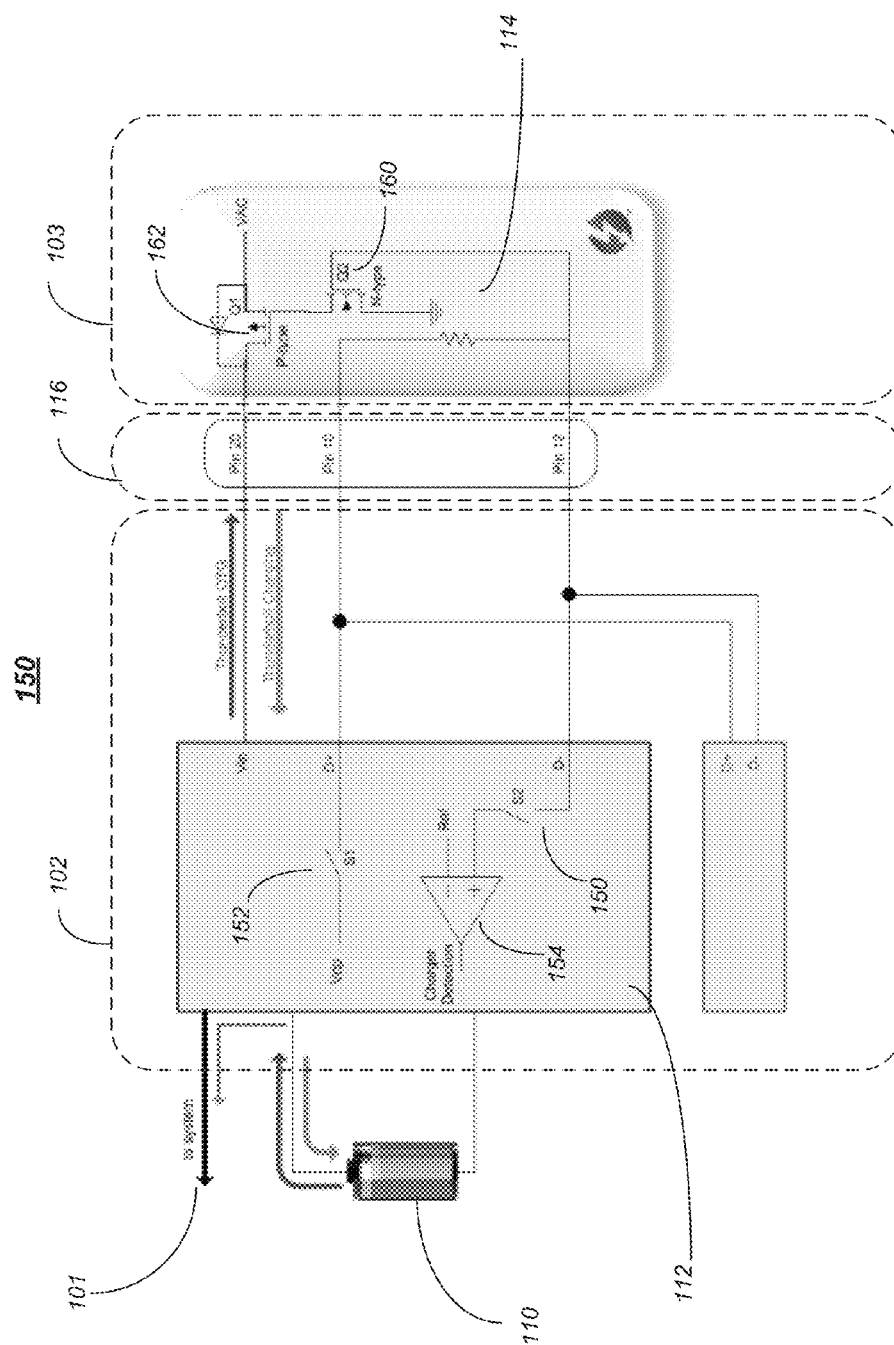
FIG. 1B illustrates one embodiment of a second system.

FIG. 1B illustrates one embodiment of a system. FIG. 1B illustrates a block diagram of a system 150 that may be the same or similar to system 100 of FIG. 1A where like elements are similarly numbered. In various embodiments, system 150 may include expanded views of charger control circuit 112 and charger circuit 114. The embodiments are not limited to the number, type, arrangement or configuration of elements shown in this figure.

In various embodiments, a charger control circuit 112 may be coupled to Thunderbolt™ technology enabled interface 106 and may be arranged to operate in a charging mode or an on-the-go (OTG) mode based on information received from the Thunderbolt™ technology enabled interface 106. For example, usage mode or OTG mode may comprise a specification, standard or operating mode for apparatus 101 that allows the apparatus 101 to act as a host allowing peripheral devices such as a display, mouse, keyboard, etc. to be attached and utilized via the Thunderbolt™ technology enabled interface 106. In various embodiments, charging mode may comprise a specification, standard or operating mode for apparatus 101 that allows the apparatus 101 to receive power from an external device, such as charger 103, via the Thunderbolt™ technology enabled interface 106.

In some embodiments the charger control circuit 112 may be arranged to detect a charger, such as charger 103, coupled to the interface 106. The charger control circuit 112 may be arranged to detect a charger 103 coupled to the Thunderbolt™ technology enabled interface 106 using one or more of pin 10 or pin 12 of the Thunderbolt™ technology enabled interface 106 and/or Thunderbolt™ technology enabled cable 116 in various embodiments. For example, a first switching element 152 may be coupled to pin 10 of the Thunderbolt™ technology enabled interface 106, a second switching element 150 may be coupled to pin 12 of the Thunderbolt™ technology enabled interface 106, and a comparator 154 may be coupled to the second switching element 150 in some embodiments. In various embodiments, the comparator 154 may be arranged to compare a reference voltage (Ref) and a charger voltage and to indicate (e.g. Charger Detection) that a charger 103 is coupled to the Thunderbolt™ technology enabled interface 106 if the charger voltage is greater than the reference voltage.

Pins 10 and 12 in a mDP or Thunderbolt™ technology enabled cable 116, connector or interface 106 are unused in a Thunderbolt™ technology enabled mode in some embodiments. In various embodiments, these pins can be used for charger 103 detection without impacting other Thunderbolt™ technology enabled operations in daisy chain. As shown in charger circuit 114, pins 10 and 12 may be internally connected in Thunderbolt™ technology enabled charger 103. As a result, when both switching element 152 and switching element 150 (e.g. switches) are closed, Vdp may appear at charger detection comparator 154. In some embodiments, if Vdp is higher than Ref, comparator 154 may output or assert a high signal to indicate the presence of charger 103. For non-charger/normal Thunderbolt™ technology enabled devices, pins 10 and 12 are not connected as discussed in more detail with reference to FIGS. 2A and 2B. For example, in some embodiments the charger control circuit 112 may be arranged to detect an input/output (I/O) device coupled to the Thunderbolt™ technology enabled interface 106 and may operate in the OTG mode. The embodiments are not limited in this respect.

In various embodiments, one or more components of apparatus 101 may be arranged to monitor a power or battery level for the apparatus 101. For example, charger control circuit 112 may be arranged to monitor a charge or power level for energy storage module 110 in some embodiments. A threshold power or battery level may be predetermined, set or established in some embodiments. For example, a battery 110 threshold may be set as the minimum charge level of the battery 110 such that above this threshold, apparatus 101 is assured of being able to power up successfully. Other embodiments are described and claimed.

Charger control circuit 112 may be arranged to and to operate in a first charging mode if a charger 103 is detected at the Thunderbolt™ technology enabled interface 106 by charger control circuit 112 and a power level for the apparatus 101 exceeds the power threshold. For example, the first charging mode may comprise a full charging mode and the charger control circuit 112 may be arranged to receive power from charger 103 via the Thunderbolt™ technology enabled interface 106 to charge one or more energy storage modules 110. In various embodiments, when the battery 110 is above the power threshold upon charger 103 detection, charger control circuit 112 may be arranged to switch from OTG mode to charging mode.

In some embodiments, the charger control circuit 112 may be arranged to operate in a second charging mode if a power level for the apparatus 101 falls below the power threshold and a charger 103 is coupled to the Thunderbolt™ technology enabled interface 106. When the power for the apparatus 101 is below the power threshold, sufficient power to operate the apparatus may not be available. Additionally, sufficient power to detect and react to a charger connected to the Thunderbolt™ technology enabled interface 106 may also be unavailable. As such, in various embodiments the second charging mode may comprise a trickle charging mode and the power control circuit 112 may be arranged to provide a trickle charge to one or more energy storage modules 110 until the power level for the apparatus exceeds the power threshold. In some embodiments, when the power threshold has been reached or exceed, the apparatus 101 may become operational and the charger control circuit 112 may switch to the first charging mode.

In some embodiments, charger 103 may include charger circuit 114. Charger circuit 114 maybe coupled to the Thunderbolt™ technology enabled interface 106 in various embodiments. In some embodiments, the charger circuit 114 may be arranged to operate in a first charging mode or a second charging mode based on information received from the Thunderbolt™ technology enabled interface 106. The information received may comprise characteristics of a device coupled to the Thunderbolt™ technology enabled interface 106 in various embodiments. For example, charger 103 may receive information about apparatus 101 via the Thunderbolt™ technology enabled interface 106 and Thunderbolt™ technology enabled cable 116 in some embodiments.

In various embodiments, the characteristics may comprise one or more of a power level for the device 101 coupled to the Thunderbolt™ technology enabled interface 106 or capabilities for the device 101 coupled to the Thunderbolt™ technology enabled interface 106. For example, the power level may comprise a comparison with a power threshold and the charger circuit may be arranged to operate in a first charging mode if the power level is above the power threshold or a second charging mode if the power level is below the power threshold.

The first charging mode may comprise a full charging mode and the second charging mode may comprise a trickle charging mode in some embodiments. For example, the threshold may comprise a minimum power level for the device coupled to the Thunderbolt™ technology enabled interface 106 to operate, and the charging mode may be selected based on this power level. In some embodiments, when the power level for the device 101 is below the threshold, the trickle charging mode may be employed. In other embodiments, when the power of the device 101 is above the threshold, the full charging mode may be used. The embodiments are not limited in this context.

In some embodiments, the charger circuit 114 may be arranged to operate in the first charging mode or the second charging mode based on information received over one or more of pin 10 or pin 12 of the Thunderbolt™ technology enabled interface 106 or cable 116. In various embodiments, as described in more detail with reference to FIG. 3, the charger circuit 114 may be arranged to operate in the first charging mode or the second charging mode for a plurality of Thunderbolt™ technology enabled interface enabled devices coupled in series. Other embodiments are described and claimed.

In various embodiments, as shown in FIG. 1B, the charger circuit 114 may comprise a first switching element 160 and a second switching element 162. The switching elements may comprise one or more diodes or metal oxide semiconductor field effect transistors (MOSFET), for example. In some embodiments, the first switching element 160 may be switched on and the second switching element 162 may be switched off in the second or trickle charging mode and the first and second switching elements 160, 162 may be switched on in the first or full charging mode. For example, in the first charging mode, switching elements 160 and 162 may be turned on and power may be supplied from the charger 103 to apparatus 101 to charge batter 110.

In other embodiments, when battery 110 is below the power threshold, charger 103 detection may not be operational by apparatus 101. In these embodiments, serial or Thunderbolt™ technology enabled charging current will flow through switching element 162 to slowly charge up battery 110 to above the power threshold. This may comprise the second or trickle charging mode in some embodiments. The embodiments are not limited in this context.

Figure 2A:
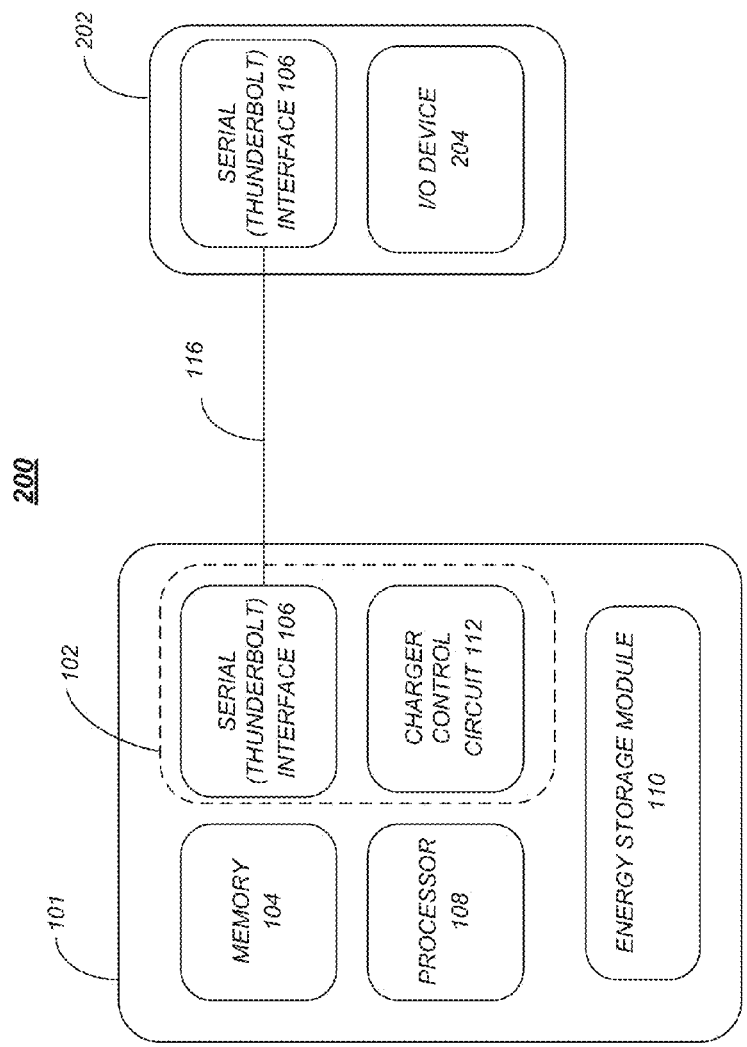
FIG. 2A illustrates one embodiment of a third system.

FIG. 2A illustrates a system 200. In some embodiments, system 200 may be the same or similar to systems 100 and 150 of FIGS. 1A and 1B respectively, where like elements are similarly numbered. In various embodiments, however, system 300 may include apparatus 202 coupled to apparatus 101 instead of charger 103. In various embodiments, apparatus 202 may comprise a peripheral device. For example, apparatus may comprise a display, storage device, television (TV), keyboard, mouse or other peripheral device and may include Thunderbolt™ technology enabled interface 106 and I/O device 204. I/O device 204 may comprise any suitable I/O device compatible with the Thunderbolt™ technology enabled interface 106 and suitable for use with apparatus 101.

Figure 2B:
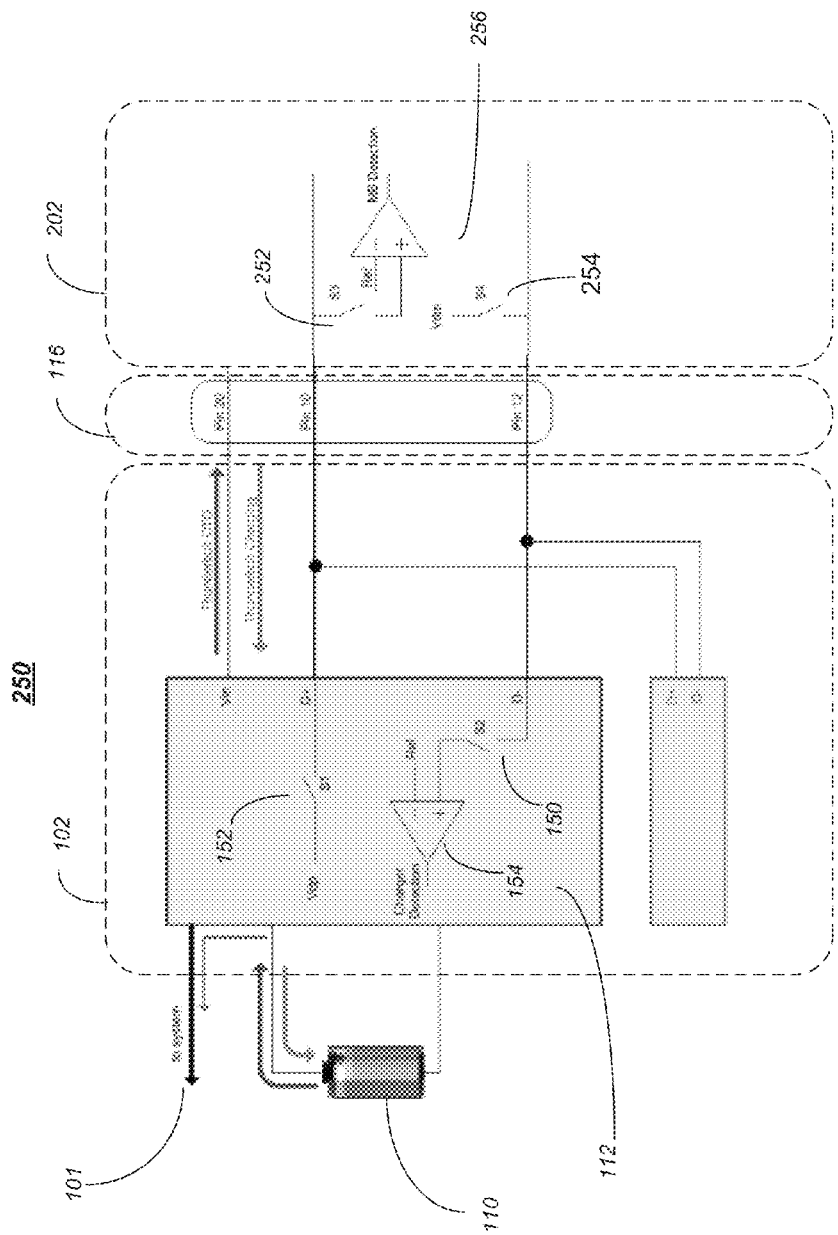
FIG. 2B illustrates one embodiment of a fourth system.

Additional details of system 200 are shown in system 250 of FIG. 2B, which may be the same or similar to system 200. In various embodiments, system 250 includes expanded views of apparatus 101 and apparatus 202. As shown in FIG. 2B, apparatus 202 may include a I/O device circuit 256. In various embodiments, circuit 256 may comprise a circuit that is present to identify a Thunderbolt™ technology enabled compatible device. In various embodiments, circuit 256 may comprise a display charger detection circuit and may be used when multiple devices are connected together in a daisy chain or serial configuration. As shown in system 250, when switching elements 152 and 252 are closed, display device 202 may detect apparatus 101 and switch 254 may be closed. In some embodiments, this may assert the battery charger detection resulting in the detection being latched. In other embodiments, all switches 252 and 254 may be open for normal lane 3 operations when the device 202 functions as a traditional Thunderbolt™ technology enabled device.

Figure 3:
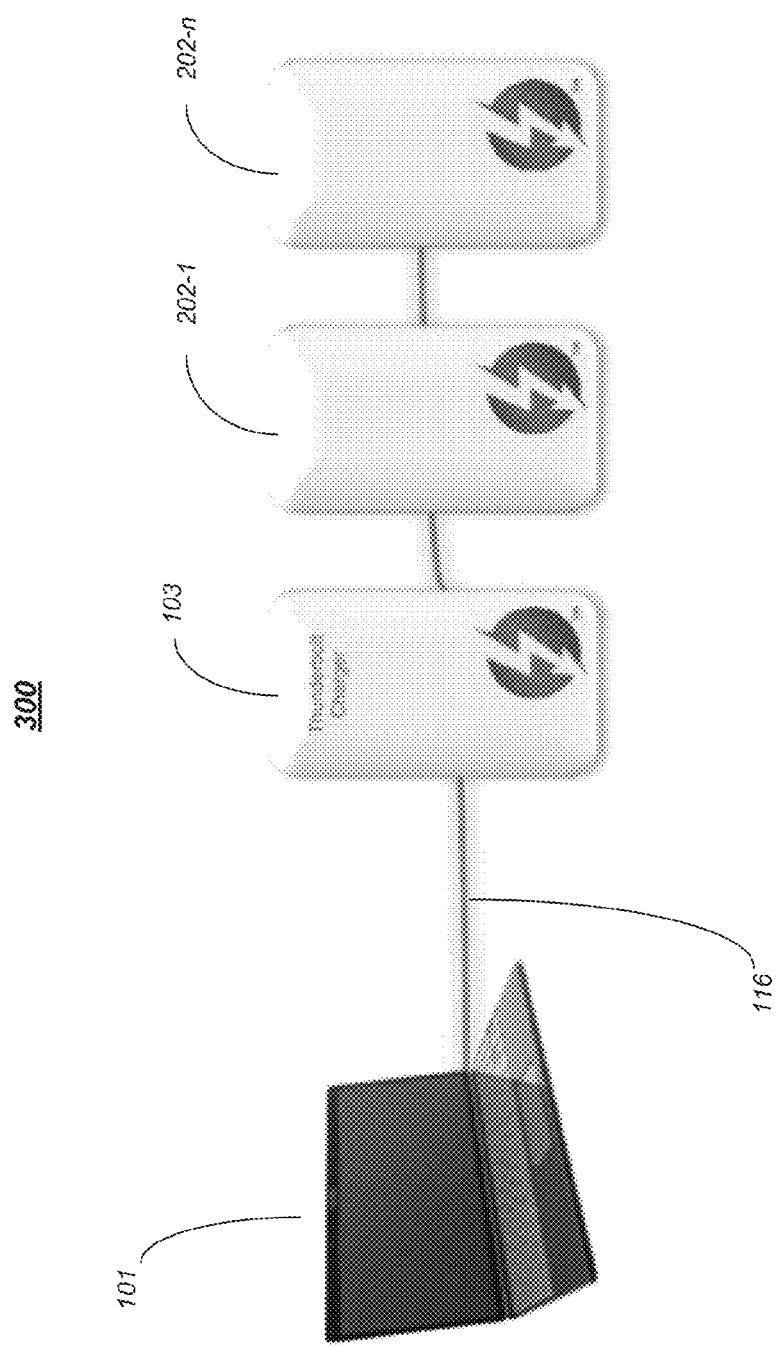
FIG. 3 illustrates one embodiment of a fifth system.

FIG. 3 illustrates a system 300. System 300 may comprise an example of a system in which multiple Thunderbolt™ technology enabled capable devices 101, 103, 202-1-n are daisy changed together in a series configuration. As shown in FIG. 3, device 101 may comprise a computing device such as a laptop computer and apparatus 103 may comprise a charger as described above with reference to FIGS. 1A, 1B, 2A and 2B. The remaining Thunderbolt™ technology enabled devices 202-1-n may comprise any number of additional Thunderbolt™ technology enabled devices.

As shown in FIG. 3, charger 103 may be operative to supply power to both computing device 101 and Thunderbolt™ technology enabled devices 202-1-n where n is any positive integer between 1-7. In various embodiments, only one charger 103 may be permitted in the daisy chain, but this charger may be operative at the same time device 202-1-n using the techniques described herein. In some embodiments, a single Thunderbolt™ technology enabled port (e.g. Thunderbolt™ technology enabled interface 106 of apparatus 101) may be arranged to support up to seven Thunderbolt™ technology enabled devices 103 and 202-1-n. In various embodiments, up to two of the devices 202-1-n may comprise high-resolution displays using DisplayPort. Other embodiments are described and claimed.

Figure 4:
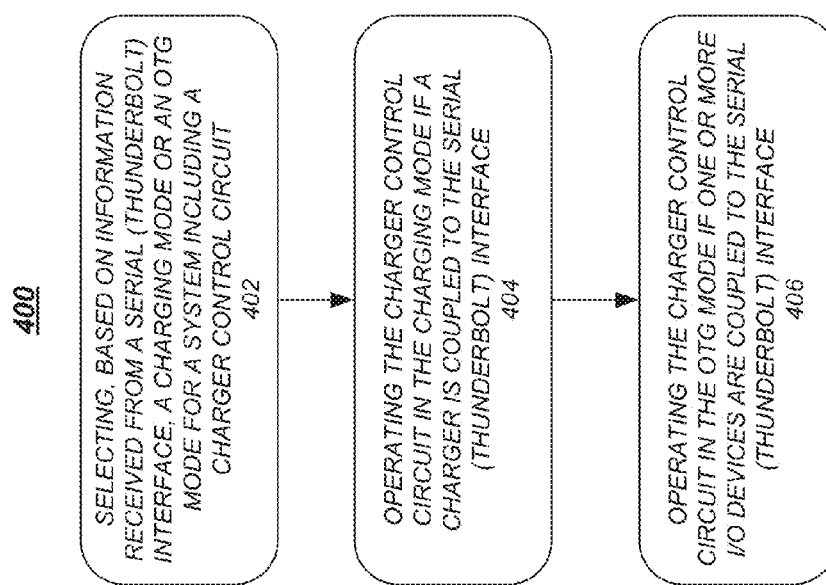
FIG. 4 illustrates one embodiment of a logic flow.

FIG. 4 illustrates one embodiment of a logic flow 400. The logic flow 400 may be performed by various systems and/or devices and may be implemented as hardware, software, firmware, and/or any combination thereof, as desired for a given set of design parameters or performance constraints. For example, one or more operations of the logic flow 400 may be implemented by executable programming or computer-readable instructions to be executed by a logic device (e.g., computer, processor). Logic flow 400 may describe the Thunderbolt™ technology enabled or serial interface charging techniques described above with reference to FIGS. 1A, 1B, 2A, 2B and 3.

In various embodiments, a charging mode or an on-the-go (OTG) mode may be selected for a system including a charger control circuit based on information received from a Thunderbolt™ technology enabled or serial interface at 402. For example, apparatus 101 may include charger control circuit 112 that is arranged to select a charging mode or an OTG mode based on information received from one or more of apparatus 103, 202, etc. At 404, in some embodiments, the charger control circuit may be operated in the charging mode if a charger is coupled to the Thunderbolt™ technology enabled or serial interface. For example, if charger control circuit 112 detected charger 103 coupled to Thunderbolt™ technology enabled interface 106, charger control circuit 112 may be arranged to implement the charging mode.

In some embodiments, the charger control circuit may operate in the OTG mode if one or more input/output (I/O) devices are coupled to the Thunderbolt™ technology enabled interface at 406. For example, if charger control circuit 112 detects I/O device 202 coupled to Thunderbolt™ technology enabled interface 106, OTG mode may be implemented for apparatus 101. Other embodiments are described and claimed.

The charger control circuit may be operated in a first charging mode if a charger is coupled to the Thunderbolt™ technology enabled interface and a power level for the system exceeds a power threshold in various embodiments. For example, if a power level of battery 110 is above a threshold that enables apparatus 101 to operate effectively and charger 103 is coupled to Thunderbolt™ technology enabled interface 106, charger control circuit 112 may be arranged to operate in a first charging mode that comprises a full charging mode to provide power to battery 110. In other embodiments, the charger control circuit may operate in a second charging mode if the power level for the system falls below the power threshold. For example, if the power level of battery 110 is insufficient for apparatus 101 to operate, charger control circuit 112 or charger circuit 114 may be arranged to implement a second charging mode that comprises a trickle charging mode. In various embodiments, the trickle charging mode may be operative to provide a slow charge to batter 110 to raise the power level above the threshold, at which point the system may switch from the second charging mode to the first charging mode. The embodiments are not limited in this respect.

Figure 5:
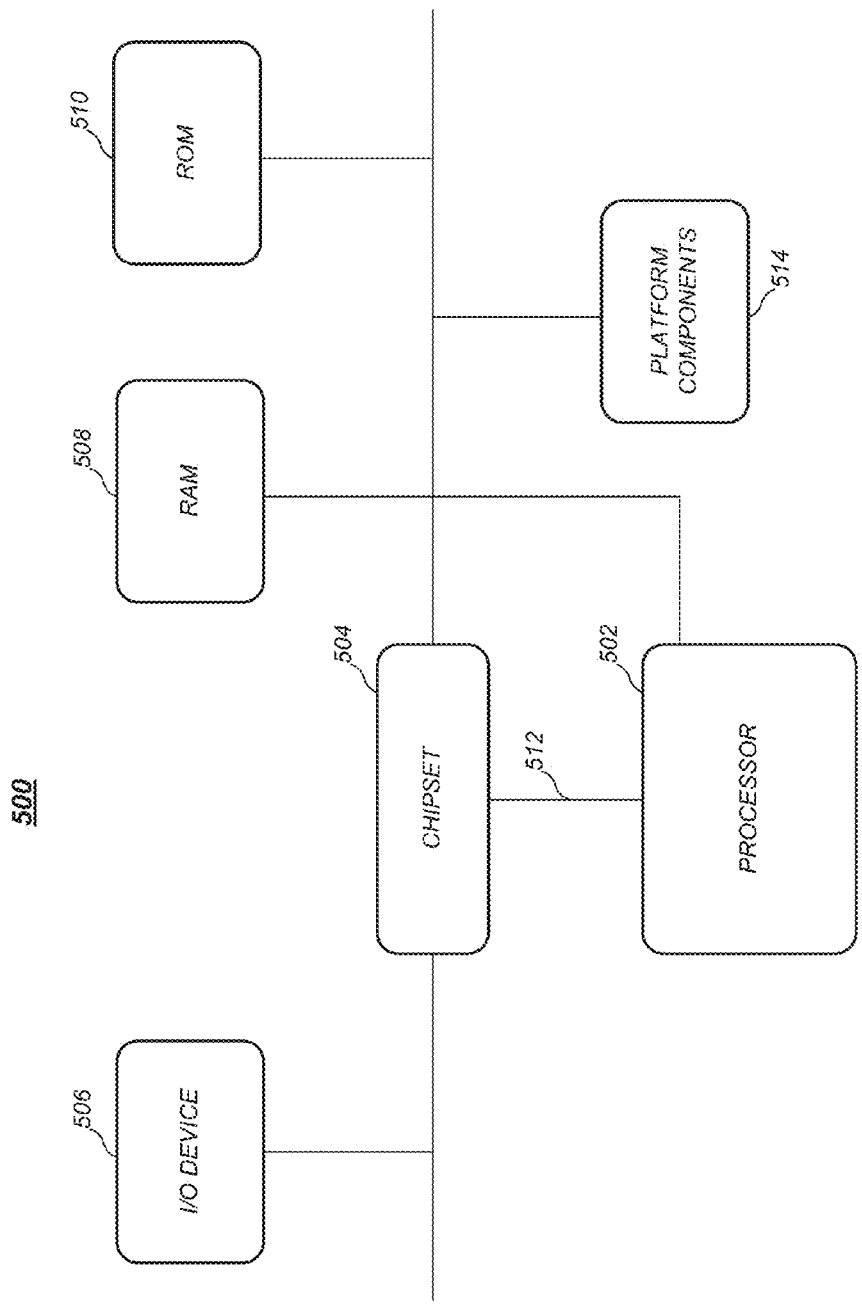
FIG. 5 illustrates one embodiment of a sixth system.

FIG. 5 is a diagram of an exemplary system embodiment. In particular, FIG. 5 is a diagram showing a system 500, which may include various elements. For instance, FIG. 5 shows that system 500 may include a processor 502, a chipset 504, an input/output (I/O) device 506, a random access memory (RAM) (such as dynamic RAM (DRAM)) 508, and a read only memory (ROM) 510, and various platform components 514 (e.g., a fan, a crossflow blower, a heat sink, DTM system, cooling system, housing, vents, and so forth). These elements may be implemented in hardware, software, firmware, or any combination thereof. The embodiments, however, are not limited to these elements.

As shown in FIG. 5, I/O device 506, RAM 508, and ROM 510 are coupled to processor 502 by way of chipset 504. Chipset 504 may be coupled to processor 502 by a bus 512. Accordingly, bus 512 may include multiple lines.

Processor 502 may be a central processing unit comprising one or more processor cores and may include any number of processors having any number of processor cores. The processor 502 may include any type of processing unit, such as, for example, CPU, multi-processing unit, a reduced instruction set computer (RISC), a processor that have a pipeline, a complex instruction set computer (CISC), digital signal processor (DSP), and so forth.

Although not shown, the system 500 may include various interface circuits, such as an Thunderbolt™ technology enabled interface, Ethernet interface and/or a Universal Serial Bus (USB) interface, and/or the like. In some exemplary embodiments, the I/O device 506 may comprise one or more input devices connected to interface circuits for entering data and commands into the system 500. For example, the input devices may include a keyboard, mouse, touch screen, track pad, track ball, isopoint, a voice recognition system, and/or the like. Similarly, the I/O device 506 may comprise one or more output devices connected to the interface circuits for outputting information to an operator. For example, the output devices may include one or more displays, printers, speakers, and/or other output devices, if desired. For example, one of the output devices may be a display. The display may be a cathode ray tube (CRTs), liquid crystal displays (LCDs), or any other type of display.

The system 500 may also have a wired or wireless network interface to exchange data with other devices via a connection to a network. The network connection may be any type of network connection, such as an Ethernet connection, digital subscriber line (DSL), telephone line, coaxial cable, etc. The network may be any type of network, such as the Internet, a telephone network, a cable network, a wireless network, a packet-switched network, a circuit-switched network, and/or the like.

Numerous specific details have been set forth herein to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Some embodiments may be implemented, for example, using a machine-readable or computer-readable medium or article which may store an instruction, a set of instructions or computer executable code that, if executed by a machine or processor, may cause the machine or processor to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, volatile or non-volatile memory or media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

It should be noted that the methods described herein do not have to be executed in the order described, or in any particular order. Moreover, various activities described with respect to the methods identified herein can be executed in serial or parallel fashion.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

It is emphasized that the Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter that lies in less than all features of a single disclosed embodiment. Thus the following claims are hereby incorporated into the Detailed Description, with each claim standing on its own as a separate preferred embodiment. In the appended claims, the terms "including" and "in which" are used as the plain-English equivalents of the respective terms "comprising" and "wherein," respectively. Moreover, the terms "first," "second," and "third," etc. are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus, comprising:
    a serial interface arranged to utilize two or more protocols; and
    a charger control circuit coupled to the serial interface, the charger control circuit arranged to operate in at least one charging mode or a usage mode based on information to be received from the serial interface, the charger control circuit arranged to operate in one of a first charging mode or a second charging mode depending on a power level for a system, the charger control circuit arranged to operate in the second charging mode if the power level for the system is below a power threshold, the second charging mode comprising a trickle charging mode, and the charger control circuit arranged to provide a trickle charge to one or more energy storage modules at least until the power threshold is reached by the one or more energy storage modules.

2. The apparatus of claim 1, the charger control circuit arranged to detect a charger when coupled to the serial interface and to operate in the first charging mode if the power level for the system exceeds the power threshold, the first charging mode comprising a full charging mode and the charger control circuit arranged to receive power via the serial interface to charge the one or more energy storage modules.

3. The apparatus of claim 1, the charger control circuit arranged to detect an input/output (I/O) device when coupled to the serial interface and to operate in the usage mode, the usage mode comprising an on-the-go (OTG) mode.

4. The apparatus of claim 1, the charger control circuit arranged to detect a charger when coupled to the serial interface using one or more of pin 10 or pin 12 of the serial interface.

5. The apparatus of claim 1, the charger control circuit comprising:
    a first switching element coupled to pin 10 of the serial interface;
    a second switching element coupled to pin 12 of the serial interface; and
    a comparator coupled to the second switching element, the comparator arranged to compare a reference voltage and a charger voltage and to indicate that a charger is coupled to the serial interface if the charger voltage is greater than the reference voltage.

6. The apparatus of claim 1, the serial interface comprising an interface having technology arranged to switch between a Peripheral Component Interconnect express (PCIe) protocol and a DisplayPort protocol using a single cable or adapter.

7. A system, comprising:
    one or more energy storage modules;
    a serial interface arranged to utilize two or more protocols; and
    a charger control circuit coupled to the serial interface, the charger control circuit arranged to operate in at least one charging mode or a usage mode based on information to be received from the serial interface, the charger control circuit arranged to operate in one of a first charging mode or a second charging mode depending on a power level for a system, the charger control circuit arranged to operate in the second charging mode if the power level for the system is below a power threshold, the second charging mode comprising a trickle charging mode, and the charger control circuit arranged to provide a trickle charge to the one or more energy storage modules at least until the power threshold is reached by the one or more energy storage modules.

8. The system of claim 7, the charger control circuit arranged to detect a charger when coupled to the serial interface and to operate in the first charging mode if the power level for the system exceeds the power threshold, the first charging mode comprising a full charging mode and the charger control circuit arranged to receive power via the serial interface to charge the one or more energy storage modules.

9. The system of claim 7, the charger control circuit arranged to detect an input/output (I/O) device when coupled to the serial interface and to operate in the usage mode, the usage mode comprising an on-the-go (OTG) mode.

10. The system of claim 7, the charger control circuit arranged to detect a charger when coupled to the serial interface using one or more of pin 10 or pin 12 of the serial interface.

11. The system of claim 7, the charger control circuit comprising:
a first switching element coupled to pin 10 of the serial interface;
a second switching element coupled to pin 12 of the serial interface; and
a comparator coupled to the second switching element, the comparator arranged to compare a reference voltage and a charger voltage and to indicate that a charger is coupled to the serial interface if the charger voltage is greater than the reference voltage.

12. The system of claim 7, the serial interface comprising an interface having technology arranged to switch between a Peripheral Component Interconnect (PCI) express protocol and a DisplayPort protocol using a single cable or adapter.

13. A computer-implemented method, comprising:
selecting, based on information to be received from a serial interface, at least one charging mode or a usage mode for a system including a charger control circuit;
operating the charger control circuit in a first charging mode if a charger is coupled to the serial interface and a power level for the system exceeds a power threshold;
operating the charger control circuit in a second charging mode if the power level for the system falls below the power threshold, the second charging mode comprising a trickle charging mode, and the charger control circuit arranged to provide a trickle charge to one or more energy storage modules at least until the power threshold is reached by the one or more energy storage modules; and
operating the charger control circuit in the usage mode if one or more input/output (I/O) devices are coupled to the serial interface.

14. The computer-implemented method of claim 13, comprising:
switching from the second charging mode to the first charging mode when the power level for the system exceeds the power threshold.

15. An apparatus, comprising:
a serial interface arranged to utilize two or more protocols; and
a charger circuit coupled to the serial interface, the charger circuit arranged to operate in a first charging mode or a second charging mode based on information to be received from the serial interface, the information comprising characteristics of a device coupled to the serial interface, the characteristics comprising one or more of a power level for the device when coupled to the serial interface or capabilities for the device when coupled to the serial interface, a power level determined based on a comparison with a power threshold, the charger circuit arranged to operate in a first charging mode if the power level is above the power threshold or a second charging mode if the power level is below the power threshold, the first charging mode comprising a full charging mode and the second charging mode comprising a trickle charging mode, and the charger circuit arranged to provide a trickle charge to one or more energy storage modules at least until the power threshold is reached by the one or more energy storage modules.

16. The apparatus of claim 15, the charger circuit arranged to operate in the first charging mode or the second charging mode based on information to be received over one or more of pin 10 or pin 12 of the serial interface and the charger circuit comprising a first switching element and a second switching element, the first switching element to be switched on and the second switching element to be switched off in the trickle charging mode and the first and second switching elements to be switched on in a full charging mode, the charger circuit arranged to operate in the first charging mode or the second charging mode for a plurality of serial interface enabled devices when coupled in series.

* * * * *